United States Patent [19]

Sargent

[11] Patent Number: 5,363,532
[45] Date of Patent: Nov. 15, 1994

[54] APPARATUS FOR CLAMPING EYEGLASSES

[76] Inventor: Charles L. Sargent, 3000 Glazier Way #160, Ann Arbor, Mich. 48105

[21] Appl. No.: 100,328

[22] Filed: Aug. 2, 1993

Related U.S. Application Data

[62] Division of Ser. No. 761,473, Sep. 18, 1991, abandoned.

[51] Int. Cl.$^5$ .......................... B25B 5/14; G02C 13/00
[52] U.S. Cl. ........................................ 15/268; 15/114; 15/214; 15/223; 81/3.5; 248/902; 269/243; 269/246; 269/265; 269/909
[58] Field of Search .................. 15/268, 214, 114, 223; 248/902; 269/243, 246, 265, 269, 270, 909; 81/3.5

[56] References Cited

U.S. PATENT DOCUMENTS

| | | | |
|---|---|---|---|
| 434,946 | 8/1890 | Parker | 81/3.5 |
| 650,870 | 6/1990 | Rosenbrook . | |
| 684,811 | 10/1901 | Grove | 269/909 |
| 799,552 | 9/1905 | Fenstermacher . | |
| 1,013,711 | 1/1912 | Wiggins . | |
| 1,172,718 | 2/1916 | Lennards | 15/214 |
| 2,045,372 | 6/1936 | Schumacher | 269/265 |
| 2,210,360 | 8/1940 | Caldwell | 81/3.5 |
| 2,221,108 | 11/1940 | Rathbun | 269/246 |
| 2,241,205 | 5/1941 | Kimber . | |
| 2,684,002 | 7/1954 | Horvath | 81/3.5 |
| 2,930,567 | 3/1960 | Lloyd-Young | 248/902 |
| 3,269,224 | 8/1966 | Magee | 81/3.5 |
| 3,550,890 | 12/1970 | Kemp . | |
| 3,552,701 | 1/1971 | Montagano | 248/902 |
| 3,623,689 | 11/1971 | Johnston | 248/902 |
| 3,895,718 | 7/1975 | Seiller | 248/902 |
| 4,949,947 | 8/1990 | Savoie et al. | 269/266 |
| 5,137,263 | 8/1992 | Savoie et al. | 269/266 |

FOREIGN PATENT DOCUMENTS 2106276  9/1972  Germany ............................ 269/909

Primary Examiner—David A. Scherbel
Assistant Examiner—Mark Spisich
Attorney, Agent, or Firm—Harness, Dickey & Pierce

[57] ABSTRACT

A method and apparatus for cleaning eyeglasses is disclosed in which a holding device is provided with a clamp mechanism for mounting eyeglasses in the holding device in a manner which provides clear access to the lens surfaces of the eyeglasses. A cleaning and drying device is provided with a brush at one end for use in cleaning the lenses with soap while an absorbent material is mounted to the other end to dry the lenses after cleaning. The apparatus aids in cleaning the lenses in a manner that completely removes oil from the lens surfaces and prevents the oil from being smeared over the lenses.

15 Claims, 3 Drawing Sheets

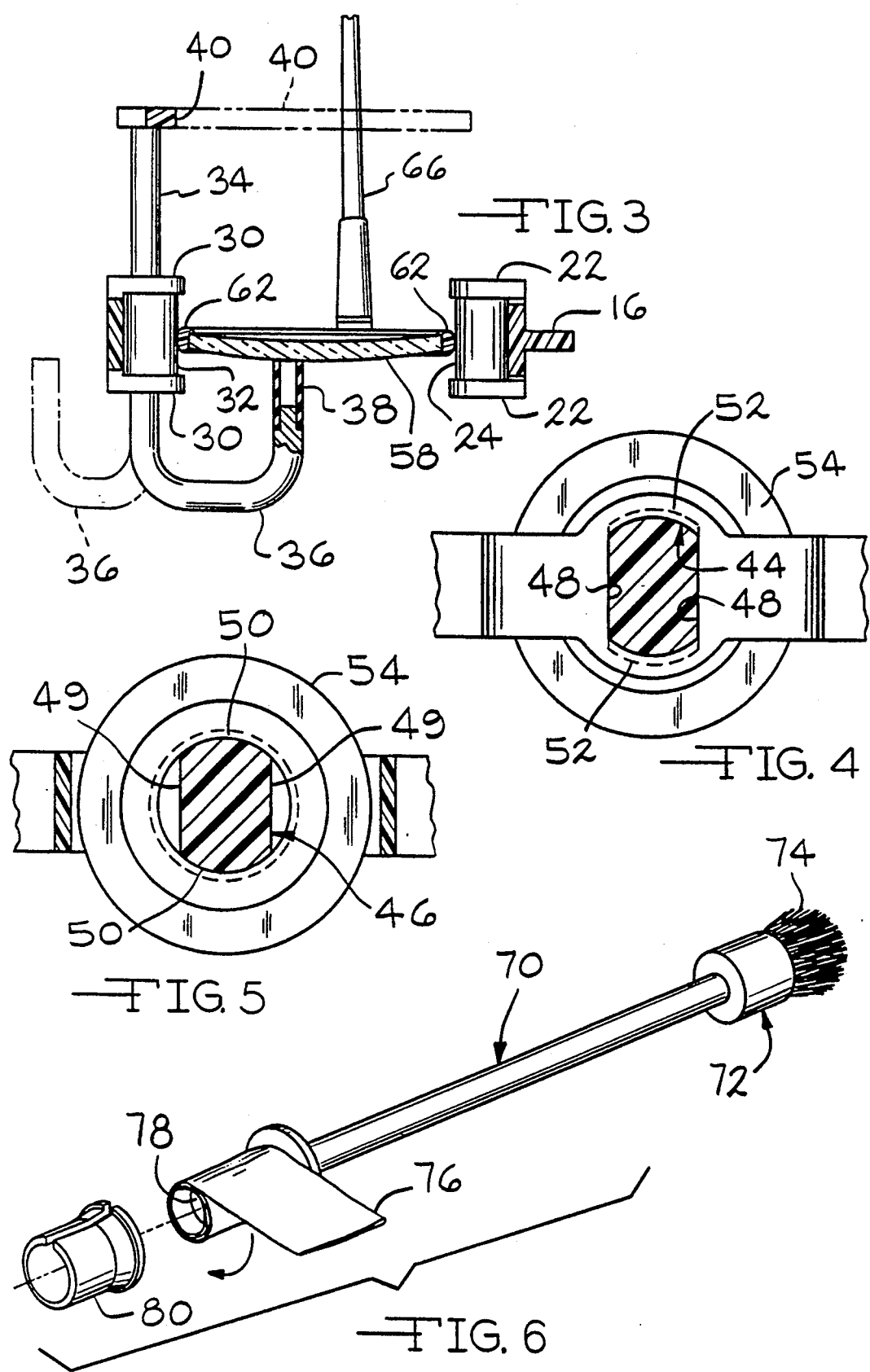

APPARATUS FOR CLAMPING EYEGLASSES

This is a division of U.S. patent application Ser. No. 07/761,473, filed Sep. 18, 1991, abandoned.

BACKGROUND AND SUMMARY OF THE INVENTION

The present invention relates to an apparatus and method for cleaning eyeglasses and in particular to an apparatus that aids in thorough cleansing of eyeglasses.

All persons who wear eyeglasses encounter the difficulties associates with cleaning them. Especially hard to remove are the body oils that are transferred to the eyeglass lenses and frame from the wearer's eyebrows. The oil not only sticks to the lenses but is also easily smeared by the wearer during the cleaning process. While cleaning the eyeglasses, contact of the lenses by the wearer's hands can prevent the lenses from being thoroughly cleaned.

Accordingly, it is an object of the present invention to provide an apparatus for holding and cleaning eyeglasses so that they are untouched by one's hands, thereby reducing the smearing of oils on the lenses.

The apparatus of the present invention includes two separate devices, one for holding the eyeglasses and the other for cleaning and drying the eyeglasses.

It is a feature of the present invention that the holding device contacts the eyeglasses only at the periphery of the lenses such that both surfaces of the lenses are freely accessible for thorough cleaning.

It is an advantage of the holding d&vice to provide a retainer for holding the bows of the eyeglasses in an open position, away from the lenses, so that access to the lenses is unobstructed.

It is a further feature of the holding device of the present invention that the eyeglasses can be held underneath a running water faucet and the eyeglasses thoroughly cleaned without one's hands becoming wet during the process.

Further objects, features and advantages of the invention will become apparent from a consideration of the following description and the appended claims when taken in connection with the accompanying drawings.

BRIEF DESCRIPTION OF THE DRAWINGS

FIG. 3 is a sectional view of the holding device and eyeglasses clamped therein as seen from substantially line 3—3 of FIG. 2;

FIG. 4 is a sectional view of the holding device as seen from substantially line 4—4 of FIG. 2;

FIG. 5 is a sectional view of the holding device as seen from substantially line 5—5 of FIG. 2;

FIG. 6 is an exploded perspective view of the cleaning and drying device;

DETAILED DESCRIPTION OF THE DRAWINGS

Figure 1:
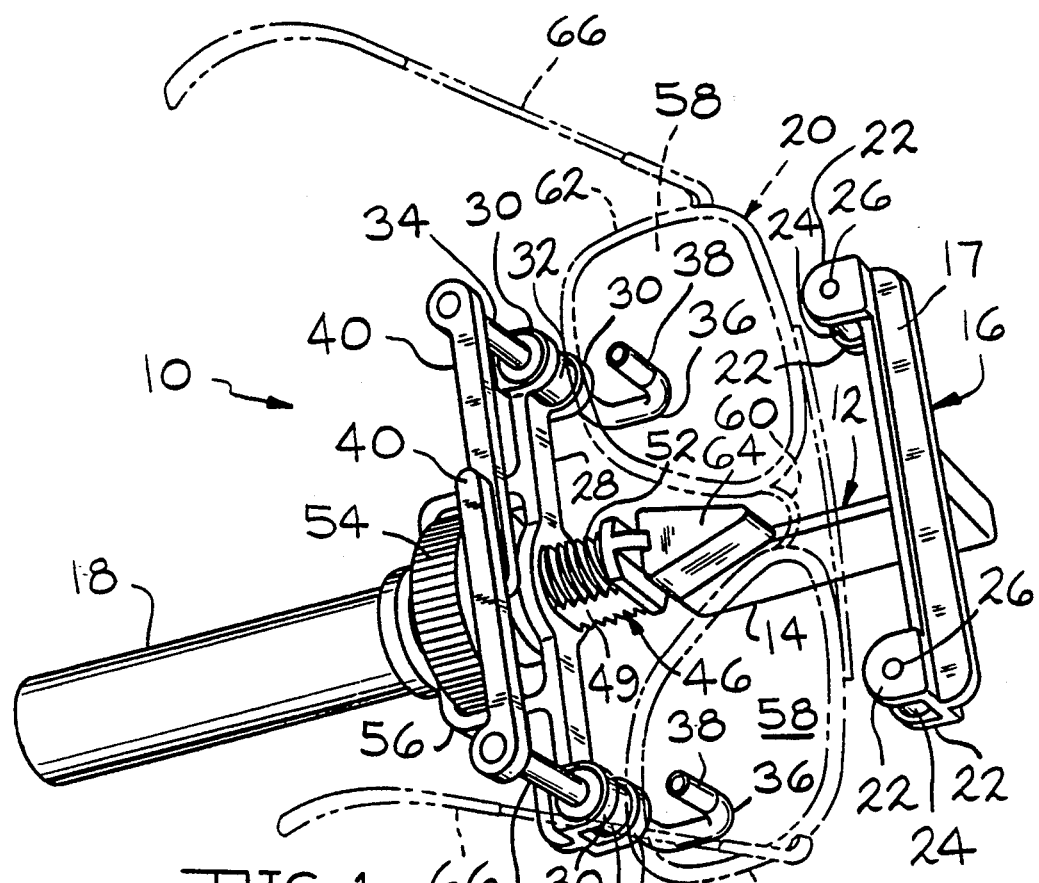
FIG. 1 is a perspective view of the holding device of the present invention showing a pair of eyeglasses supported therein prior to clamping of the eyeglasses.

The eyeglass holding device of the present invention is shown in FIG. 1 and designated generally at 10. Holding device 10 is formed with a generally T-shaped main frame 12 having an elongated upright member 14 with a cross member 16. The term "upright" is used only to describe the position of the frame member 14 in relation to the T-shaped section and is not to be viewed as a term of limitation with respect to the orientation of the member 14.

The member 14 forms a handle portion 18 at its distal end away from the cross member 16 by which the holding device 10 is held. The cross member 16 forms a fixed jaw 17 of the clamping mechanism used to clamp the eyeglasses 20 into the holding device. At its two ends, the cross member 16 forms a pair of spaced parallel mounting flanges 22 that project from the cross member 16 toward the handle portion 18. A cylindrically shaped resilient grip 24 is positioned between each of the pairs of mounting flanges 22 and a pin 26 is press-fit through the mounting flanges and extends through the grips 24 to hold the grips in place.

A movable jaw 28 is carried by the member 14 of the main frame 12 between the handle portion 18 and the cross member 16. The jaw 28 is generally parallel to the cross member 16 and is movable along a center portion of the upright member 14 toward and away from the cross member 16. The movable jaw 28 also includes a pair of mounting flanges 30 at each end. Resilient grips 32 are carried by the movable jaw between the mounting flanges 30 similar to the grips 24 carried by the fixed jaw 17. A pivot post 34 extends through each of the grips 32 and mounting flanges 30 to hold the grips in place.

The pivot post 34 extends downward from the flanges 30 as shown in FIG. 1 and are curved to form generally J-shaped support arms 36. A rubber or other soft material tip 38 is mounted to the ends of the J-shaped support arms. As will be described below, the tips 38 contact the lens surfaces and are accordingly made of a material that will not scratch the lenses. The pivot posts 34 also extend upwardly from the mounting flanges 30 and have radially extending lever arms 40 attached to the ends opposite the support arms. The support arms 36 and the lever arms 40 extend radially from the pivot posts 34 at approximately a 90° angle relative to one another such that when the support arms 36 extend in a direction away from the movable jaw 28 and toward the fixed jaw 17, the lever arms 40 are directed inwardly toward one another, generally parallel to the jaws, as shown in FIG. 1. The movable jaw 28 includes a central aperture 44 through which extends a center portion 46 of the upright member 14. The aperture 44 is circular with two parallel flat sides 48 to form a modified oval cross section. The center portion 46 of the member 14 is complementarily shaped with flat sides 49 so that the movable jaw 28 is prevented from rotating about the center portion 46. The circular surfaces 50 of the of the center portion 46 contain threads 52 upon which a threaded drive nut 54 is carried. Drive nut 54 is trapped between the movable jaw 28 and a rectangular housing 56 extending therefrom. As a result, rotation of the drive nut 54 will cause the movable jaw 28 to translate along the length of the upright member 14 as is described below in connection with the operation of holding device 10.

The movable jaw 28 is first moved to a position away from the fixed jaw 17. The two lever arms 40 are positioned as shown in FIG. 1, extending toward one another generally parallel to the movable jaw 28. In this rotated position of the pivot posts 34, the support arms 36 extend from the movable jaw 28 toward the fixed jaw 17. Eyeglasses 20 are positioned in the device with the face of the lenses 58 touching or resting on the tips 38 of the support arms. A nose piece 60 of the eyeglass frame is rested upon the upright member 14. The upright member 14 and the support arms 36 thus provide a three point support for the eyeglasses 20. The three point support is very stable and allows the user to let the eyeglasses rest unattended during the clamping process. Preferably the eyeglasses are positioned with the frame 62 at the bottom of the lenses contacting the grips 32.

To accommodate eyeglasses having various curvatures to the lenses, the grips 32 are provided with some axial length to ensure engagement of the grips 32 with the eyeglass frame when the lenses are resting on support arms 40. A positioning post 64 extends upwardly from the upright member 14 between the two lenses 58 to hold the eyeglasses in the approximate location during the clamping operation. Clearance is provided between the eyeglasses and the positioning post 64 so as to accommodate variously sized eyeglasses. While the eyeglasses shown have a frame surrounding the lenses, it is to be understood that the holding device can also be used with eyeglasses not having a frame surrounding the lenses. In such a case, the grips will directly engage the lenses at the periphery of the lenses.

The drive nut 54 is then rotated in the appropriate direction to cause the movable jaw 28 to move toward the fixed jaw 17. Eventually, the upper edge of the eyeglasses above the lenses 58 will contact the resilient grips 24 of the fixed jaw. These grips are also provided with an axial length to accommodate variously curved lenses to ensure that the eyeglasses will contact the grips 24. The drive nut 54 is rotated to snugly clamp the eyeglasses between the fixed jaw 17 and the movable jaw 28.

Figure 2:
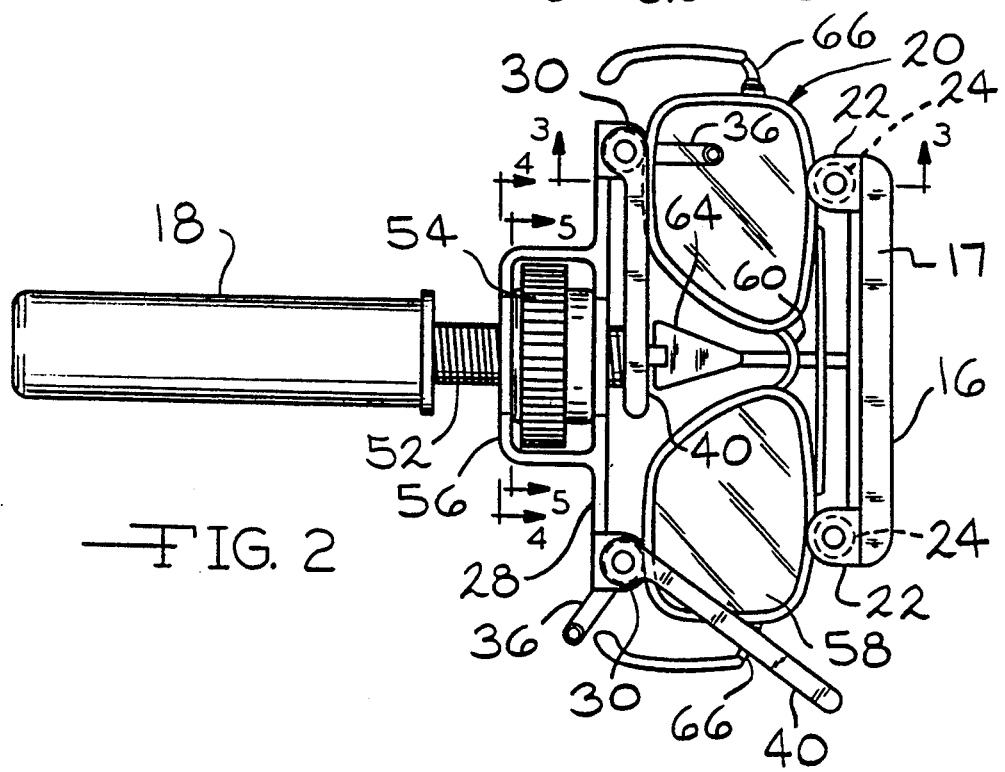
FIG. 2 is a plan view of the holding device showing the eyeglasses clamped therein.

Once the eyeglasses have been firmly clamped, the lever arms 40 are rotated over the lenses to rotate the support arms 36 outwardly, away from the face surface of the lenses. FIG. 2 shows one lever arm 40 so rotated. The lever arms 40 are rotated outwardly until they contact the bows 66 of the eyeglass frame. By contacting the bows 66, the lever arms 40 hold the bows in the open position, to prevent the bows from folding across the inside surface of the lenses. The resilient nature of the grips 32 enables the clamping force to create sufficient friction on the pivot posts 34 so that enough resistance is provided to prevent the bows 66 from causing rotation of the lever arms 40. The positions of one lever arm 40 and one support arm 36 are shown in FIG. 3. The solid line indicates the position of the arms while the eyeglasses are being mounted to the holding device and the phantom line indicates the position of the arms during washing.

Attention is now directed to FIG. 6 where the cleaning and drying device 70 of the present invention is illustrated. Device 70 has two functional ends. At one end is a brush 72 having a plurality of soft bristles 74. The brush is generally cylindrical in shape and is preferable about one third the size of the eyeglass lenses. This enables the brush to be moved in a swirling pattern over the lenses for a thorough cleaning. The opposite end holds an absorbent material 76 for drying the lenses.

The absorbent material 76 is spiraled around a cylindrical arbor 78 and extends from the end of the arbor. An expandable collet 80 is slid over the absorbent material 76 to hold it in place. The absorbent material 76 illustrated is a facial tissue that has been folded over once in the lengthwise direction. The tissue is wound around the arbor as shown in FIG. 6. Once the winding is complete, the expandable collet 80 is pushed over the arbor compressing the tissue between its inside diameter and the outside diameter of the arbor. The tissue is thus firmly held in place. While a disposable tissue is shown, it is also possible to use a small absorbent cloth or other absorbent material that will not scratch the eyeglass lenses. A disposable facial tissue may be used more than once to dry the glasses with an appropriate drying interval between uses.

Figure 7:
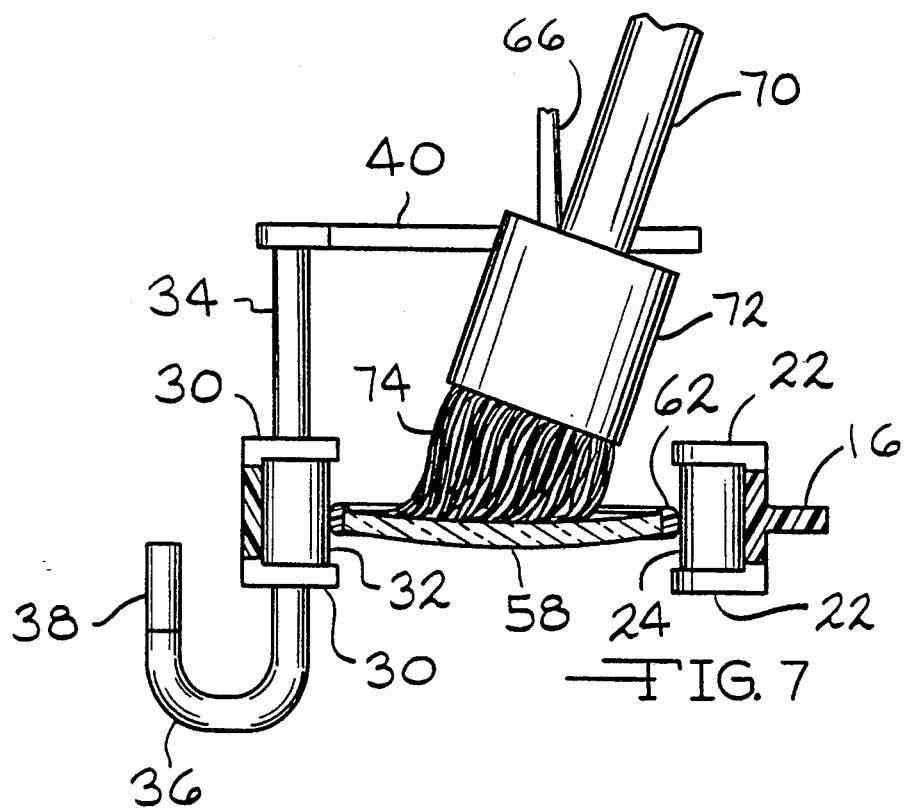
FIG. 7 is a sectional view similar to FIG. 3 showing a lens being cleaned.

Cleaning of the eyeglasses is shown in FIG. 7. The brush is first wetted and soap is applied to the brush. This can be accomplished by patting the wetted brush on a bar of soap such as ordinary hand soap. Alternatively, a liquid soap can be dispensed directly onto the brush or onto the lens. The brush is then moved in a swirling pattern over both surfaces of the lenses producing a sudsing action with water being added as needed. The cleansing not only removes oil and dirt from the lens surfaces, but also cleans the nose pads and grooves between the lenses and the frame. Since the support arms 36 have been turned away and the bows are held in an open position, full access is provided to the lens surfaces.

Figure 8:
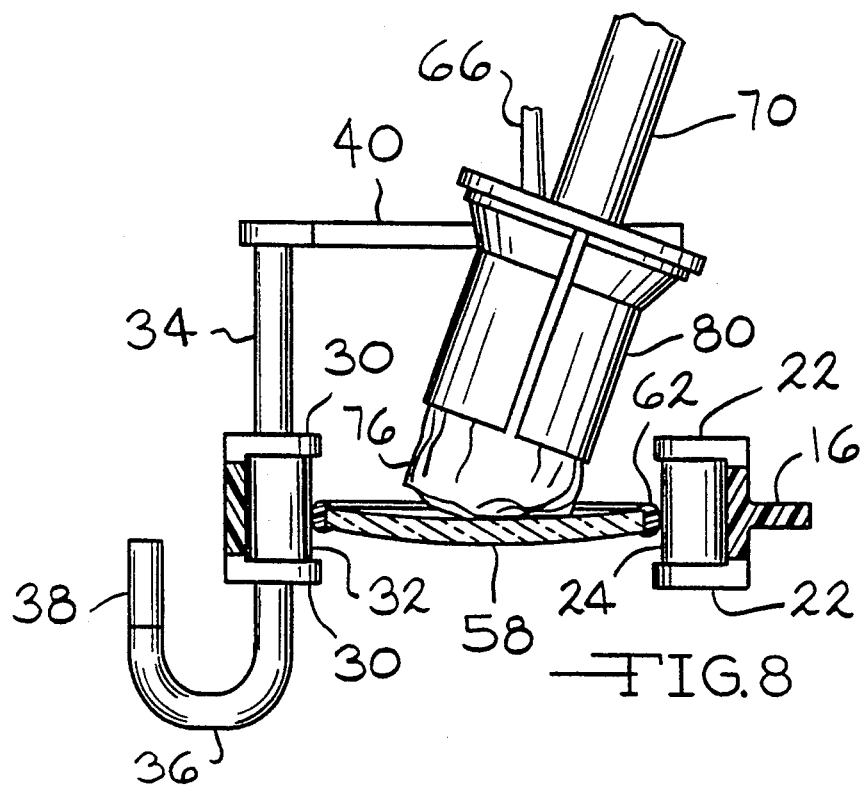
FIG. 8 is a sectional view similar to FIG. 7 showing a lens being dried after cleaning.

After thorough cleaning, the lenses are rinsed under water. All of the oils, being held in suspension by the soap, are rinsed from the lenses such that there are no oils present to smear the lenses during the drying process. Following rinsing, the brush 72 and the holding device 10 are shaken to remove excess water. The lenses are now dried as shown in FIG. 8 by gently wiping the lens surfaces with the absorbent material 76. After cleaning and drying of the eyeglasses, the eyeglasses are removed from the holder 10 by a reverse of a process used to clamp the eyeglasses therein.

The apparatus of the present invention thus provides a convenient way to thoroughly clean eyeglasses without the risk of smearing oils on the eyeglass lenses. The apparatus further enables the cleaning operation to be carried out without one's hands being wetted. Thus, the apparatus of the present invention achieves the desired objectives.

The clamping device described above may be used for other purposes than cleaning eyeglasses. For example, it may be useful for holding eyeglasses during repair of the frames or coating of the lenses.

The brush and drying means is also useful in removing body oils, if the eyeglasses are held by hand, rather than in a clamp. Even through the user's hands may be wetted, the total cleaning process and no smear drying are beneficial.

It is to be understood that the invention is not limited to the exact construction or method illustrated and described above, but that various changes and modifications may be made without departing from the spirit and scope of the invention as defined in the following claims.

I claim:

1. An apparatus for clamping eyeglasses, the eyeglasses having a frame and lenses mounted on the frame, the lenses having two surfaces and peripheral edges and the frame further having bows movable between a closed position overlaying one of the surfaces of the lenses and an open position extending away form the lenses, said clamping apparatus enabling washing and drying of the lenses, said clamping apparatus comprising:
- a holder including clamp means for clamping said eyeglasses at a plurality of locations, said clamp means being engagable with the eyeglasses at said locations so as to provide access to all of the lens surfaces and said holder being spaced from the lens surfaces to provide access to the lens surfaces for cleaning the lenses;
- means on said holder for grasping of said holder; and
- means on said holder adapted to engage said bows for retaining the bows of the eyeglasses in the open position regardless of the orientation of the eyeglasses in space to maintain unobstructed access to the lens surfaces for cleaning the lenses.

2. The apparatus of claim 1 wherein said clamp means includes means for engaging the eyeglasses at the peripheral edges of the lenses to avoid obstructing the surfaces of the lenses to be cleaned.

3. The apparatus of claim 1 wherein said clamp means is movable between a position engaging the eyeglasses and a position disengaged from the eyeglasses, and said apparatus further comprises means for supporting the eyeglasses on said holder while said clamp means is being moved to said position engaging the eyeglasses.

4. The apparatus of claim 3 wherein said support means provides at least three points of support for the eyeglasses.

5. Apparatus for clamping eyeglasses having lenses, a nose bridge between the lenses and movable bows, said apparatus comprising:
- a main frame;
- a handle portion coupled to said main frame;
- means defining a fixed jaw attached to said main frame, said fixed jaw including a grip thereon for contact with the eyeglasses;
- means defining a movable jaw carried by said main frame, said movable jaw including a grip for contact with the eyeglasses,
- means for moving said movable jaw between a release position away from said fixed jaw and a clamp position closer to said fixed jaw to selectively clamp the eyeglasses between said jaws and to selectively release the eyeglasses therefrom;
- support means carried by said main frame defining at least three support points for supporting the eyeglasses in said apparatus before said movable jaw is moved to said clamp position, at least one of said support points being engagable with a lens of the eyeglasses; and
- said support means including means for moving said at least one of said support points away from the engaged lens of the eyeglasses after said movable jaw has been moved to said clamp position to provide unobstructed access to the lenses of said eyeglasses.

6. The apparatus of claim 5 wherein said grips are engagable with the eyeglasses at peripheral edges of the lenses.

7. The apparatus of claim 5 wherein:
- the eyeglasses when mounted in said apparatus are oriented with the eyeglass lenses being generally parallel to a plane defined by said fixed and movable jaws;
- said support means includes a pair of support arms each with a tip defining first and second support points engagable with a respective lens and said main frame defining a third support point adapted to support the nose bridge of the eyeglasses to provide a third point of support for the eyeglasses; and
- said support means further includes means for moving said support arms away from the lenses after the eyeglasses have been clamped to said apparatus to provide unobstructed access to the lenses.

8. The apparatus of claim 7 wherein the support means further comprises:
- a pair of pivot posts rotatably mounted to one of said jaws and oriented generally perpendicularly to the plane defined by said fixed and movable jaws, said pivot posts having two ends and said support arms being connected to a respective one of said pivot posts at one end there of to mount said support arms to said one jaw for rotation of said support arms; and
- lever arms each respectively at the other ends of said pivot posts from said support arms for rotating said pivot posts, said lever arms extending radially from said pivot posts to engage the eyeglass bows when the support arms are rotated away from the lenses to retain the bows in an open position.

9. The apparatus of claim 8 wherein each of said pivot posts passes through a respective one of said grips and said grips are resilient so that the clamping force applied to said grips compresses said grips to frictionally engage said pivot posts to provide resistance to rotation of said posts.

10. The apparatus of claim 5 further comprising at least one positioning post mounted to said main frame between said fixed and movable jaws adapted to be positioned between the eyeglass lenses to hold the eyeglasses in approximate location while the eyeglasses are being clamped in the apparatus.

11. The apparatus of claim 5 wherein said main frame has an upright member with an externally threaded portion and wherein said movable jaw is slidable on the main frame and includes a rotatable drive nut having threads engaged with the external threads of the upright member whereby said movable jaw slides along said upright member in response to rotation of the drive unit nut to move the movable jaw between the release and clamp positions.

12. The apparatus of claim 5 further comprising holding means for holding the bows of the eyeglasses in a position in which they do not obstruct access to the lenses of the eyeglasses regardless of the orientation of said apparatus in space.

13. The apparatus of claim 12 wherein said holding means includes a pair of lever arms movable from stowed positions to operable positions engaging the respective eyeglass bows to hold the bows in an open position.

14. The apparatus of claim 13 wherein said lever arms are coupled to said means for moving said at least one of said support points to move said lever arms to said operable positions upon movement of said at least one support point away from said lenses.

15. The apparatus of claim 14 wherein said support means includes a pair of support arms each fixed to a respective one of said lever arms and each with a tip forming a respective one of said support points adapted to contact a surface of the lenses, said support arms and said lever arms being coupled to one another to move said lever arms to said operable positions upon movement of said support arms away from said lenses.

* * * * *